(12) United States Patent
Ben-Ami

(10) Patent No.: US 9,395,011 B2
(45) Date of Patent: Jul. 19, 2016

(54) PROPORTIONAL VALVE CONTROLLED WITH A PIEZOELECTRIC LINEAR ACTUATOR

(71) Applicant: IPU INDUSTRIES LTD., Yavne (IL)

(72) Inventor: Eyal David Ben-Ami, Rishon Le Zion (IL)

(73) Assignee: IPU INDUSTRIES LTD., Yavne (IL)

( * ) Notice: Subject to any disclaimer, the term of this patent is extended or adjusted under 35 U.S.C. 154(b) by 0 days.

(21) Appl. No.: 14/348,921

(22) PCT Filed: Oct. 14, 2012

(86) PCT No.: PCT/IB2012/055582
§ 371 (c)(1),
(2) Date: Apr. 1, 2014

(87) PCT Pub. No.: WO2014/057314
PCT Pub. Date: Apr. 17, 2014

(65) Prior Publication Data
US 2015/0097129 A1 Apr. 9, 2015

(51) Int. Cl.
*F16K 31/02* (2006.01)
*F16K 31/00* (2006.01)
*H02N 2/02* (2006.01)

(52) U.S. Cl.
CPC .............. *F16K 31/007* (2013.01); *F16K 31/004* (2013.01); *H02N 2/025* (2013.01)

(58) Field of Classification Search
CPC ...... F16K 31/007; F16K 31/004; H02N 2/025
USPC ................................................... 251/129.06
See application file for complete search history.

(56) References Cited

U.S. PATENT DOCUMENTS

| | | | | |
|---|---|---|---|---|
| 3,684,237 A | * | 8/1972 | Hyde et al. | 251/58 |
| 4,225,110 A | * | 9/1980 | Akkerman et al. | 251/58 |
| 5,868,375 A | * | 2/1999 | Reinicke et al. | 251/129.21 |
| 5,967,188 A | * | 10/1999 | Chien-Chuan | 137/883 |
| 6,474,353 B1 | * | 11/2002 | Sturman | F15B 13/044 137/1 |
| 7,498,719 B2 | | 3/2009 | Piotr et al. | |
| 7,717,132 B2 | * | 5/2010 | Burkhart et al. | 137/625.65 |
| 2003/0226987 A1 | | 12/2003 | Gallmeyer et al. | |
| 2005/0263731 A1 | * | 12/2005 | Fauni | 251/129.11 |
| 2007/0075286 A1 | * | 4/2007 | Tanner | 251/129.06 |
| 2009/0114292 A1 | * | 5/2009 | Shafer et al. | 137/512 |
| 2013/0276914 A1 | * | 10/2013 | Kritzman | F16K 31/004 137/485 |

FOREIGN PATENT DOCUMENTS

FR 2 425 599 12/1979
WO 98/37343 8/1998

OTHER PUBLICATIONS

International Search Report and Written Opinion for PCT/IB2012/055582, mailed Jun. 13, 2013.

* cited by examiner

*Primary Examiner* — John K Fristoe, Jr.
*Assistant Examiner* — Kelsey Rohman
(74) *Attorney, Agent, or Firm* — The Law Office of Joseph L. Felber

(57) ABSTRACT

The present invention relates to valves and/or fluid pumps and in particular to such valves and/or fluid pumps controlled with gating and/or control module comprising a piezoelectric linear actuator to provide gating of the valve and/or pump system.

39 Claims, 9 Drawing Sheets

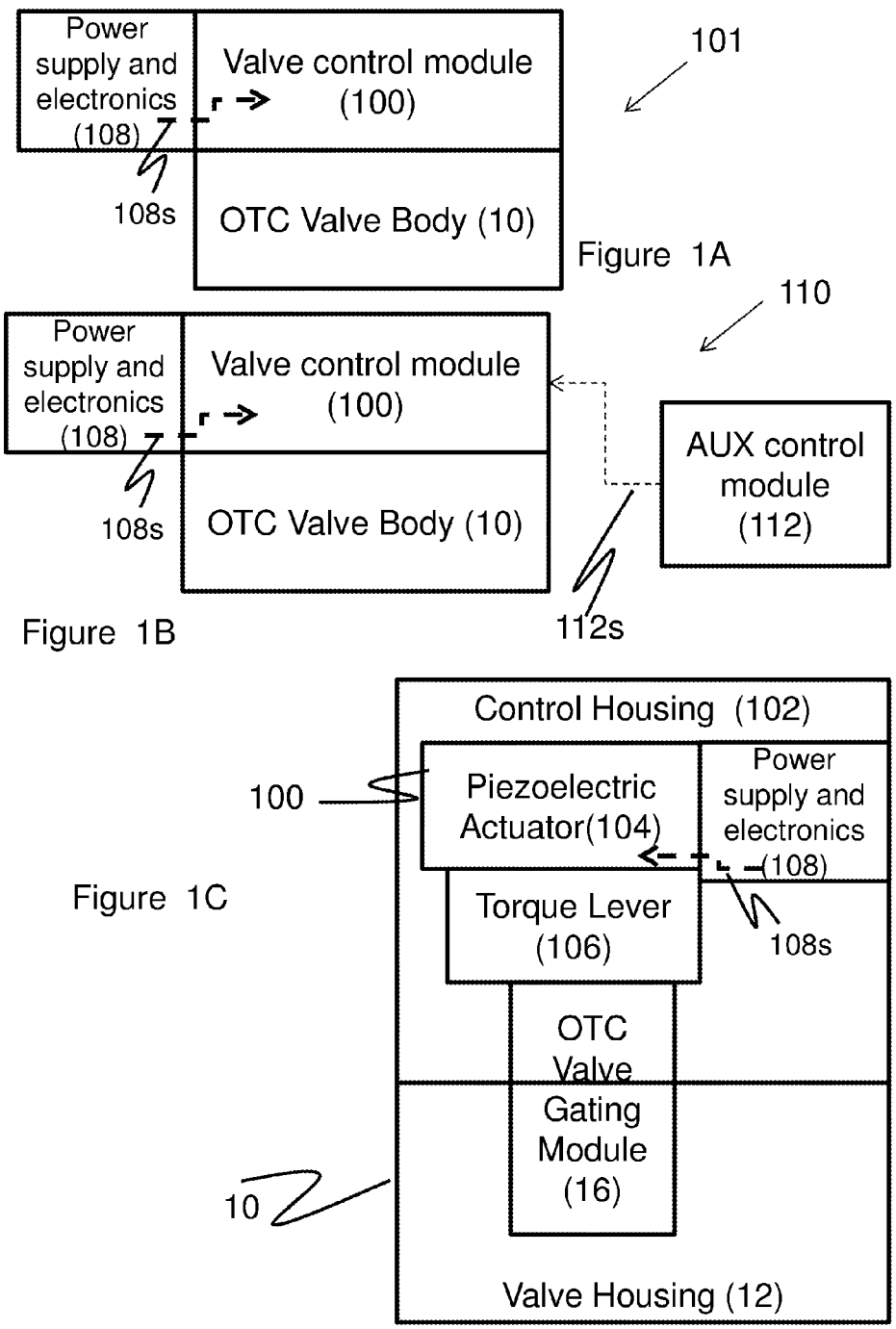

Figure 7A
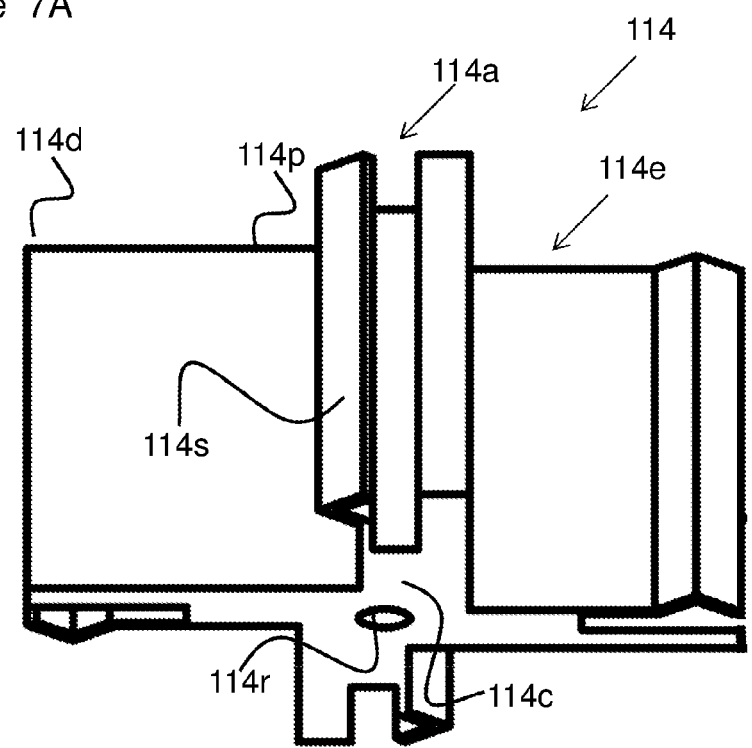
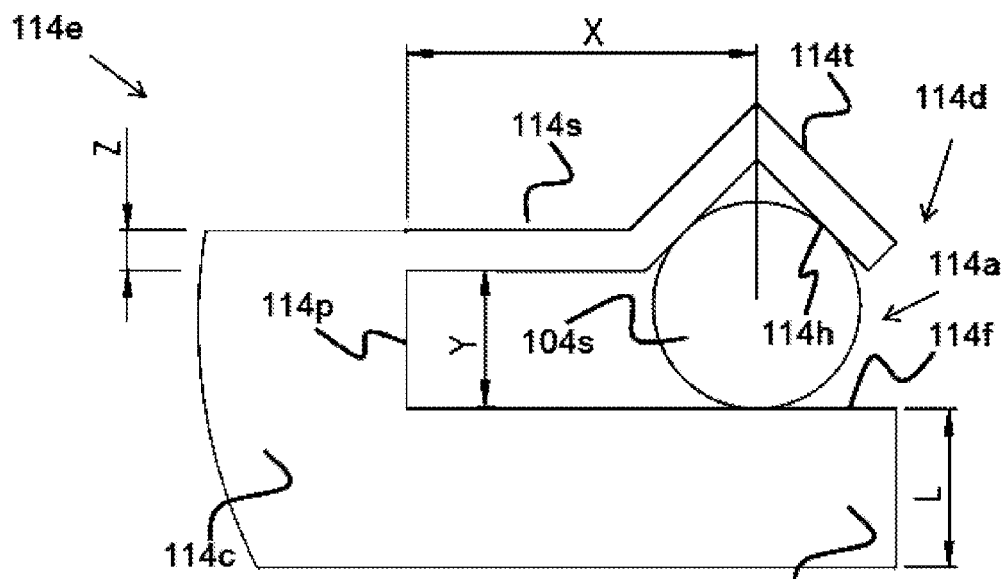
Figure 7B

PROPORTIONAL VALVE CONTROLLED WITH A PIEZOELECTRIC LINEAR ACTUATOR

FIELD OF THE INVENTION

The present invention relates to valves and/or fluid pumps and in particular to such valves and/or fluid pumps controlled with a piezoelectric linear actuator providing a retrofit valve control unit and/or a piezoelectric valve.

BACKGROUND OF THE INVENTION

Valves and valve systems have been designed in the past having a valve actuated by a solenoid, piezoelectric stack or magnetorestrictive rod to control the flow of fluid through the valve system. The valve system may be realized as a common rail fuel injector, electrohydraulic actuator system, electronically-controlled fuel injector, gasoline port injector, fluid metering valve, relief valve, ventilation system, inhalators, reducing valve, direct valve or direct-injection gasoline injector, or any valve for controlling the flow of a flowing fluid or gas.

Flow control of a flowing fluid through a valve is generally achieved by manipulating the size of the valve opening between a valve gating member and a corresponding valve seat. Closing and/or opening of the valve opening generally involves manipulating a plunger and/or driving a valve member relative to its corresponding valve seat and/or valve opening.

However, in solenoid-controlled valve systems, it is often difficult to accurately control movement and positioning of the valve member through the control signals applied to the solenoids. This is especially true when intermediate positioning of a solenoid-controlled valve for example between the closed state and the open state, and maintained in a fixed position is desired.

Solenoid-controlled valves, by their very nature, are susceptible to variability in their operation due to inductive delays, eddy currents, spring preloads, solenoid force characteristics and varying fluid flow forces, overheating and disintegration of the valve housing generally due to overheating of the solenoid. Such weak spots must be carefully considered and accounted for in any solenoid-controlled valve system design. Moreover, the response time of the solenoids limits the minimum possible dwell times between valve actuations and makes the valve system generally more susceptible to various sources of variability.

While solenoids provide large forces and have long strokes, solenoids do have certain drawbacks. For example, first, during actuation, current must be continuously supplied to the solenoid in order to maintain the solenoid in its energized position. Further, to overcome the inertia of the armature and provide faster response times, a solenoid is driven by a stepped current waveform. A very large current is initially provided to switch the solenoid on; and after the solenoid has changed state, the drive current is stepped down to a minimum value required to hold the solenoid in that state. Thus, a relatively complex and high power current driver is required.

In addition to requiring a relatively complex and high current power source, the requirement of continuous current flow to maintain the solenoid at its energized position leads to heating of the solenoid. The existence of such a heat source, as well as the ability to properly dissipate the heat, is often of concern depending on the environment in which the solenoid is used, for example in plastic environment.

Additionally, the force produced by a solenoid is dependent on the air gap between the armature and stator and is not easily controlled by the input signal. This makes the solenoid difficult to use as a proportional actuator. Large proportional solenoids are common, but they operate near or at the saturation point and are very inefficient. Small, relatively fast acting non-proportional solenoids may have response times defined by the armature displacement as fast as 350 microseconds. However, this response time can be a significant limitation in some applications that require high repetition valve actuation rates or closely spaced events. Further, it is known that there is a substantial delay between the start of the current signal and the start of the armature motion. This delay is due to the inductive delay, experienced with solenoids, the delay experienced between the voltage and magnetic flux required to exert force on the armature. In valve systems, such delays lead to variability in the fluid flow.

While prior art electroactive actuators such as piezoelectric stacks and magnetorestrictive rods eliminate the response time and proportionality shortcomings of the solenoid, particularly in that it offers the benefit of using little power during while maintaining a static valve position for extended periods of time, while capable of handling large forces, however the valve stroke capabilities are very small. The output of these electroactive actuators must then be mechanically or hydraulically amplified, limiting the response time and proportionality benefits that they offer.

Because of their small strain capabilities, these actuators also tend to be large. Additionally, these actuators are unidirectional, i.e., they move in only one direction in response to a control signal. Therefore, any valve or mass moved by the actuator requires a return biasing force, for example with a return spring, to be applied to return the valve or mass to its original position. Often, the spring comprises a significant amount of the force required to move the valve or mass and represents another source of variability. Also, the beneficial response time of the actuator will have no impact on the return of the valve or mass, as it depends completely on the return spring.

Current valves are further prone to overheating, saturation, and exhibit hysteresis, all leading to inaccuracies with respect to controlling the flow through the valve such that the valve does not react linearly with respect to a control signal. Such factors lead to unpredictability of the valve and lack of true flow control through the valve body.

Other drawbacks of current piezoelectric valves is their inability to generate high holding forces and therefore provide valves with only low holding force that are not suitable for applications requiring larger holding forces.

SUMMARY OF THE INVENTION

The present invention overcomes the deficiencies of the background by providing a fluid control module comprising an assembly of at least one or more and preferably a plurality of piezoelectric linear actuator that provides for controlling fluid flow through a construct such as a valve body and/or a pump. Optionally and preferably, the construct through which a flowing fluid may be maneuvered and controlled may for example include but is not limited to valves and/or fluid pumps and/or gas pumps and/or pumps, or the like. Optionally the fluid control module according to optional embodiments of the present invention may provide a retrofit valve control module for coupling to an existing construct for controlling the flow of a flowing fluid for example a valve body or pump body. Optionally and preferably embodiments of the present invention provide for a piezoelectric valve comprising a valve body coupled with an integrated fluid control module comprising at least one or more piezoelectric linear actuators.

An example of a piezoelectric actuator 104 referenced and illustrated herein, may optionally and most preferably be realized in the form of the piezoelectric actuator described in U.S. Pat. No. 7,498,719 to Piotr et al, that is incorporated herein by reference as if fully set forth.

Within the context of this application the term fluid refers to any flowing fluid in various states for example including but not limited to liquids, gases, air or the like.

An optional embodiment of the present invention provides a valve comprising at least one or more controllable piezoelectric actuators. Most preferably the piezoelectric actuators provide a linearly controllable valve where the flow through the valve may be controlled linearly and predictably controlled in proportion to a control signal. Most preferably the control signal and/or activating energy applied to the piezoelectric actuating module is linearly proportional with the flow through the valve body, such a that in order to obtain a certain flow 'F' through a valve body a specific and predictable control signal and/or activation signal 'S' is required, therein defining a linear slope ('m') on a Flow vs. Signal Input graph. A linearly proportional slope ('m') provides for changing the fluid flow rate through a valve body as a consequence of a direct and linear change to the input signal utilized by fluid control module or gating actuation module that is in turn, governed by the predefined slope ('m') of Flow vs. Signal Input graph specific to the valve body and control signal. Accordingly a truly linear valve is provided with predictable flow through the valve body based on a predictable control signal providing by the gating actuation module of the present invention.

Most preferably the valve control module according to the present invention comprises an encoder to increase valve linearity, and to ensure resolution of the linear valve therein minimizing the potential valve hysteresis effect.

Optionally and preferably encoder may be configured to provide a control module for any type of valve and/or valve gating control for example including but not limited to on-off valves, proportional valves or the like.

Most preferably, the valve piezoelectric actuator module according to optional embodiments of the present invention may be turned on or off without a lag or phase.

Optionally and preferably the valve according to the present invention provides a valve assembly that may exert a holding force of at least about 1 Kg or more. Optionally and preferably the valve and particularly the valve control and/or gaiting module according to the present invention may be configured to provide a holding force from about 100 g up to about 2 Kg, from about 100 g-500 g; 500 g-1000 g and up to about 2 Kg.

An optional embodiment of the present invention provides a piezoelectric valve that provides a bi-directional piezoelectric actuator that may move a load along a valve stem in response to a control signal.

An optional embodiment of the present invention provides a piezoelectric valve that does not require a return spring, most preferably as the piezoelectric actuator maintains its position about the piezoelectric actuator shaft without exerting additional energy, as seen with solenoid valves.

An optional embodiment of the present invention provides a piezoelectric control module that may be retrofit to replace a valve gating control modules while maintaining the valve body.

Optionally and preferably, optional valves, for example including but not limited to solenoid controlled valves, on-off valves, any off the shelf valve, or the like, may be retrofit with the valve gating and/or control module according to the present invention.

Optionally and most preferably the piezoelectric control module according to the present invention provides a valve gating module that provides a control module that most preferably runs on low energy means.

Optionally and most preferably the control module according to the present invention provides for a valve that readily dissipates heat and/or does not overheat under standard working conditions.

An optional embodiment of the present invention provides a piezoelectric control module that may be retrofit with an existing valve body, to convert it to a linear and/or proportional valve. For example, an existing on-off valve may be retrofit with a piezoelectric control/gating module according to the present invention to form a linear and/or proportional valve about the existing valve body. For example, a valve comprising an electromagnetic actuator may be replaced with the piezoelectric valve gating module according to the present invention.

An optional embodiment of the present invention provides a piezoelectric controllable valve, utilizing a control signal that utilizes minimal energy requirements while providing maximal holding force, for example up to about 2 Kg, optionally from about 100 g, 200 g, 300 g, 400 g, 500 g, 600 g, 700 g, 800 g, 900 g, 1000 g, 1100 g, 1200 g, 1300 g, 1400 g, 1500 g, 1600 g, 1700 g, 1800 g, 1900 g, 2000 g.

Optionally and preferably piezoelectric valve gating module according may be customized and/or adapted and/or fine tuned to meet at least one or more valve requirements for example including but not limited to flow rate, energy dissipation, thrust, holding force, or the like.

Optionally and preferably the gating/control module may be customized and/or configured so as to provide the necessary holding force according a valve's requirements.

Optionally a valve control signal may be provided by at least one or more processor and/or controller for example including but not limited to an internal controller and/or external controller and/or auxiliary controller, any combination thereof.

Optionally and preferably an external controller and/or auxiliary controller may be utilized in conjunction with an internal controller to drive and control the piezoelectric valve according to the present invention. For example, a remote valve control signal may be generated by a user with an external controller and communicated to an internal controller to control the piezoelectric valve according the present invention.

Optionally internal controller may be driven with a power source and/or electronics for example including but not limited to battery, rechargeable battery, induction circuit, mains power supply, electronic circuitry, photovoltaic cells, DC power, AC power, or the like power supply as is known and accepted in the art.

Within the context of this application the term valve stem may be interchangeable with the term plunger, shaft, and moveable shaft.

Within the context of this application the term valve gating or valve gating module refers to the member of the valve required for controlling the valve opening and closing.

Within the context of this application the term valve opening refers to the opening between valve seat and valve gating member for example valve shaft, seal, plunger having a maximum opening equal to the size/length of the valve stem and/or gating module.

Within the context of this application the term valve seal member refers to that portion of the valve which functions to seal and/or close the valve about the valve flow chamber and/or valve seat.

Within the context of this application the terms proportional valve opening refers to controlling the valve open and/or close state in a proportional manner providing for gating the valve in a variable manner between 0-100% (zero and 100 percent). Optionally the term proportional opening may be interchangeably used with the term non-discrete and/or continuous control of the valve opening.

Most preferably embodiments of the present invention provide a linearly proportional valve assembly wherein the fluid flow rate through valve body may be linearly and predictably controlled with respect to a control signal, provided with a valve gating control module. Therein the present invention provides a linearly proportional valve assembly. Most preferably, the valve assembly according to embodiments of the present invention are configured such that a Fluid Flow rate 'F' through a valve body is predictable and controllable with a control signal 'S'. Most preferably the control signal 'S' may be determined and/or provided and/or configured by evaluating the graph of Flow vs. control Signal and determining the slope. Optionally the slope may be specific to a given valve assembly comprising a valve body and valve gating control module.

Embodiments of the present invention provide for the linearity by employing a controllable linear piezoelectric actuator. The linear piezoelectric actuator provides the appropriate (required) holding force, to control the flow through the valve body, without exerting additional power and/or energy, such that the valve's gating module's start and stop positions (valve stem position relative to the constant valve seat position) are linearly predictable, configurable, repeatable and controllable.

Most preferably the piezoelectric actuators provide for controlling the gating of the valve by positioning the valve stem relative to the constant position of the valve seat. Most preferably the piezoelectric actuators, may be directly (FIGS. 6-7) or indirectly (FIGS. 1-4) coupled and/or otherwise associated with the valve stem, as part of the valve gating control module, therein controlling the flow through valve body by controlling the position of valve stem relative to valve seat.

Optionally and most preferably a controller and/or processor and/or microprocessor may be provided as part of the valve gating control module to optionally elucidate and/or determine the linear relationship between the Flow 'F' and control signal 'S' for example in the form of slope ('m') as previously described. Optionally the 'F' vs. 'S' relationship is continuously updated and configured to maintain a linear relationship. Optionally gating control module may signal and/or communicate problems, for example to a user, with the valve in any portion thereof if the linear relationship is not maintained within a given range for example within one or two standard deviations.

While the foregoing description and figures depict a valve with respect to a linearly controllable valve stem, however, embodiments of this application are not limited to use with such linear valve stems. Accordingly embodiments of the present invention may be extended to ball valves, leaf type valve, turn valves, torque valve or the like valve controlled by non-linear motion and/or rotational motion, of a valve stem relative to a valve seat or valve body. Optionally the linear movement of a valve stem according to the present invention may be adapted with a linear to rotational motion converter module, optionally and preferably to provide the appropriate circular motion for example in a ball valve. Optionally appropriate conversion of linear motion to rotational motion may for example include but is not limited to gear, gear works, cam, transformer, piston, the like or any combination thereof.

While the foregoing description and figures depict a valve with respect to a linearly controllable valve stem, however, embodiments of this application are not limited to use with such valves alone, embodiments of the present invention, particularly, the gating control module may be naturally extended to use with a fluid pump system instead of the valve body as described and illustrated herein.

While the invention is described with respect to a limited number of embodiments relating to a valve it is to be understood that any valve or pump or the like device may be utilized with the present invention. The valve and/or pump and/or hydraulic pump and/or fluid pump is therefore not limited to the scope and uses described hereinbelow. Embodiments of the present invention may be realized in a number of application involving a valve, pump and/or fluid pump and/or hydraulic pump, for example including but not limited to a valve for gating any flowing fluid (liquids, gasses, oils, plasma) for any application such as medical application, industrial application, automotive industry, healthcare industry, chemical industry, manufacturing, mass production, home-use application, personal application, any combination thereof or the like. For example a valve, valve control module, or a retrofitted valve, according to optional embodiments of the present invention may be utilized in an application for example including but not limited to a faucet valve, an air valve for medical applications, flow control in a mass production line, machinery, fuel injector, or the like.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 1A-C are schematic block diagrams of exemplary valves, retrofitted with a piezoelectric valve control module according to an optional embodiment of the present invention;

FIG. 2A showing the closed configuration and FIG. 2B showing the open configuration;

FIG. 4A showing a perspective view, FIG. 4B showing a cross-sectional view revealing the construct of the valve, and FIG. 4C showing an exploded view;

FIG. 6A showing a cross-sectional view revealing the construct of the valve, and FIG. 6B showing an exploded view or the valve shown in FIG. 6A; and FIGS. 7A-B are various views of a schematic illustrative diagram of a cross-linked piezoelectric actuator load, according to an optional embodiment of the present invention, deployed in the piezoelectric valve depicted in FIGS. 6A-B, FIG. 7A provides a perspective view and FIG. 7B provides a partial close up view.

DESCRIPTION OF THE PREFERRED EMBODIMENTS

Figure 2B:
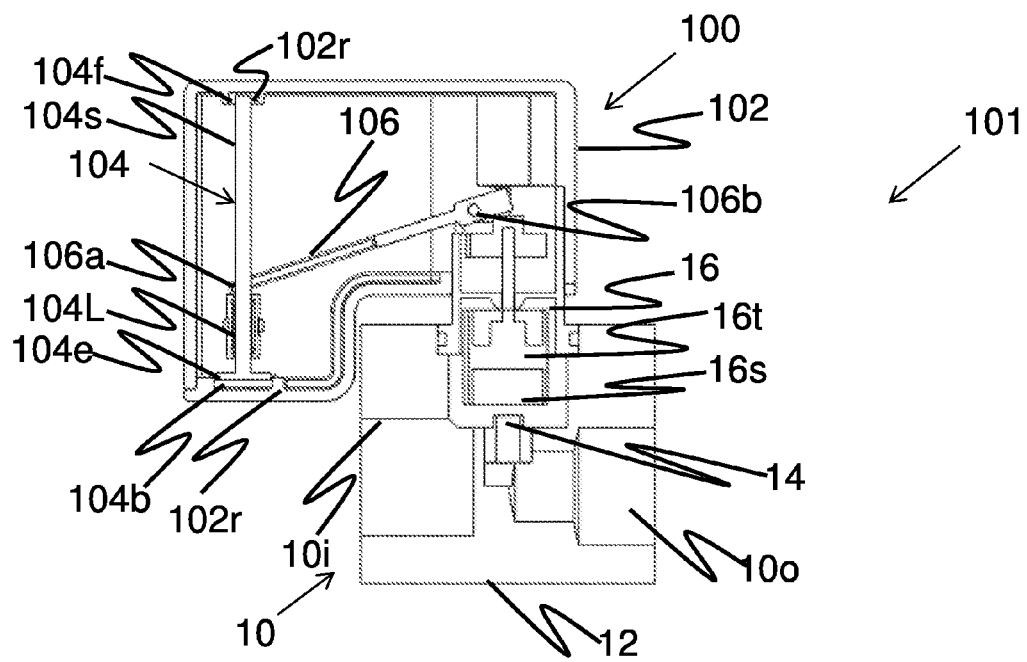
FIG. 2A-B are cross sectional views of retrofit piezoelectric control module according to an optional embodiment of the present invention associated with a valve body.

The principles and operation of the present invention may be better understood with reference to the drawings and the accompanying description. The following figure reference labels are used throughout the description to refer to similarly functioning components are used throughout the specification hereinbelow:

10 OTC valve body;
12 OTC valve housing;
14 OTC valve seat;
16 OTC valve gating module (stem and seal);
16s OTC valve seal member;
16t OTC valve stem member;
100 valve control module;
101 retrofitted valve;
102 control housing;
102r housing recess;
102s adapted surface
104 piezoelectric actuator;
104b piezoelectric actuator elastic body;
104c actuator shaft seal member;
104d actuator shaft spring member;
104e actuator piezoelectric substrate and electrodes;
104f actuator free end;
104L actuator load;
104s actuator shaft;
106 torque lever;
106a torque lever first end;
106b torque lever second end;
108 electronic circuitry module;
108s control signal;
110 dual control valve system;
112 auxiliary valve control module;
112s auxiliary control module signal;
114 cross linking load;
114a actuator shaft recess;
114b base member;
114c central body/core;
114d distal end;
114e extending arm;
114f,h luminal surface;
114p proximal end;
114r load valve stem recess;
114s shaft support member;
114t shaft receiving portion;
200 piezoelectric valve apparatus;
201 dual control valve system;
202 valve body;
204 valve inlet reservoir;
206 valve outlet reservoir;
208 valve seat;
210 gating module;
212 gating module housing;
212a first end gating module housing;
214 valve stem;
214a valve stem upper member;
214b valve stem middle member;
214c valve stem lower member;
214s valve stem plunger/seal;
216 valve seal;
216d valve seal diaphragm;
216g valve seal gasket;
220 actuator housing;
222 external actuator housing;
224 actuator cross-link member;
226 internal actuator housing;
228 lower actuator housing member/end plate;
228a actuator receiving recess;
228b valve body coupling recess;
228c gating module central recess;
228e actuator free end elastic member;
230 lower end plate member;
232 lower end plate member bore;
234 upper end plate member;
236 upper end plate member spacer;
238 actuator housing;

Most preferably embodiments of the present invention provide a linearly proportional valve assembly (110, 101, 200, 201), wherein the fluid flow rate ('F') through a valve body (10, 202) may be linearly and predictably controlled with respect to a control signal (108s,112s), with a valve gating control module (100, 210), therein the present invention provides a linearly proportional valve assembly. Most preferably, the valve assembly according to embodiments of the present invention are configured such that a Fluid Flow rate 'F' through a valve body is predictable and controllable with a control signal 'S'. Most preferably the control signal 'S' may be determined and/or provided and/or configured by evaluating the graph of Flow vs. Control Signal and determining the graph's slope. Optionally the slope may be specific to a given valve assembly comprising a valve body (10, 202) and valve gating control module (100, 210).

Accordingly, embodiments of the present invention provide for linearity by employing a gating/control module comprising controllable linear piezoelectric actuator (104). The linear piezoelectric actuator (104) provides the appropriate (required) holding force, to control the flow through the valve body (10, 202), without exerting additional power and/or energy, such that the valve's gating module's start and stop positions (valve stem 214 position relative to the constant valve seat 208 position) are linearly predictable, configurable, repeatable and controllable that do not exhibit hysteresis effects or require a return spring to maintain its position.

Most preferably the piezoelectric actuators (104) provide for controlling the gating of the valve (110, 101, 200, 201) by positioning the valve stem (214, 16t) relative to the constant position of the valve seat (208). Most preferably the piezoelectric actuators (104), may be directly (FIGS. 6-7) or indirectly (FIGS. 1-4) coupled and/or otherwise associated with the valve stem (214, 16t), as part of the valve gating control module (210, 100), therein controlling the flow through valve body by controlling the position of valve stem (16t, 214) relative to valve seat (14, 208).

Referring now to the drawings, FIGS. 1A-C are schematic block diagrams of an optional retrofitted valve 101 comprising an "over the counter" or "off the shelf" (hereinafter 'OTC') valve body 10, retrofitted with a piezoelectric valve control module 100 according to an optional embodiment of the present invention. Most preferably control module 100 comprises at least one or more piezoelectric actuator 104 and an internal power supply and electronic circuitry module 108 most preferably for providing a control signal (108s) for at least one or more piezoelectric actuators 104.

Retrofitted valve 101 comprises an OTC valve body 10 that may be coupled with a piezoelectric valve control module 100. Optionally and preferably control module 100 and OTC valve body 10 may be associated with one another about at least one or more surfaces.

Optionally control module 100 may further provide for converting the linear movement of the piezoelectric actuators utilized therein to rotational motion, optionally and preferably to provide the appropriate circular motion required to control flow of valve body 10 for example as in a ball valve. Optionally appropriate conversion of linear motion to rotational motion may for example include but is not limited to gear, gear works, cam, transformer, piston, the like or any combination thereof.

FIG. 1B shows an optional configuration of retrofitted valve 101 of FIG. 1A in the form of an optional dual control valve system 110 comprising an auxiliary valve control module 112 provided for remotely controlling and/or communicating with valve 101 via valve control module 100.

Optionally, external and/or auxiliary controller 112 may be utilized in conjunction with internal controller module 108 or module 100 to drive and control the piezoelectric valve 101 according to the present invention. For example, a remote valve control signal 112s may be generated by a user with an auxiliary controller module 112 and communicated to an internal controller 108 or control module 100 to control piezoelectric valve 101, to control the flow through valve housing 10 by adjusting the position of piezoelectric actuator 104 relative to valve seat 14 most preferably in a linearly proportional manner relative to the communicated control signal 112s.

Optionally remote and/or auxiliary controller module 112 may be provided in optional forms for example including but not limited to a computer, mobile communication device, PDA, mobile telephone, robot, android, server, dedicated device, remote control, any combination thereof or the like device comprise processing, communication and power source capabilities. Optionally auxiliary controller module 112 may further comprise a display.

Optionally controller module 112 may communicate a control signal (112s) to valve control module 100 or electronic circuitry 108 using at least one or more communication protocols and/or technology for example including but not limited to wireless, radio frequency (RF), infrared (IR), optical, wired, near field communication (NFC), far field communication (FFC), RFID technology, BLUETOOTH® (IEEE 802.15.1), UHF 2.4 to 2.485 GHz, acoustic, or any combination thereof.

Optionally remote and/or auxiliary controller module 112 may communicate with an internal controller module 100 or the like electronic circuitry 108 for generating and communication a control signal (108s) to at least one or more piezoelectric actuator 104.

Optionally remote and/or auxiliary controller module 112 may be controlled manually by a user.

Optionally and more preferably remote and/or auxiliary controller module 112 may be controlled automatically according to at least one or more triggering event, for example including but not limited to a trigger, an occurrence, an event, an alarm, a scheduled event, an unscheduled event, threshold crossing, any combination thereof or the like triggering event.

FIG. 1C shows an optional retrofitted valve 101 further comprising an optional torque lever 106 as part of the valve control module. Control module 100 comprises housing 102 provided for receiving actuator 104 and an optional torque lever 106 that may be associated with OTC valve 10 about the OTCT valve's internal gating module 16. Optionally and preferably OTC gating module provides for fitting and/or coupling or otherwise associating valve housing 12 with control housing 102.

Optionally piezoelectric control module 100 may be configured to fit with any OTC gating module 16 via a customizable mediating member for example including but not limited to torque lever 106 or the like. Optionally control housing 102 may be customized to fit an OTC gating module 16 without utilizing a customizable mediating member.

Optionally valve gating module 16 is controllable with piezoelectric actuator 104 via torque lever 106. Most preferably torque lever 106 comprises a first end 106a and a second end 106b.

Most preferably torque lever first end 106a is provides for coupling and/or associating with actuator 104. Optionally torque lever first end 106a is coupled and/or otherwise associated with actuator 104 about at least one of an actuator load 104L or actuator shaft 104s.

Most preferably torque lever second end 106b is provided for coupling and/or associating with actuator OTC valve gating module 16. Optionally torque lever second end 106b is coupled and/or otherwise associated with actuator OTC valve gating module 16 about an OTC valve stem 16t to control the position of valve seal 16s relative to the valve seat 14. Optionally and preferably torque lever second end 106b is pivoted with OTC valve stem 16t.

Figure 2A:
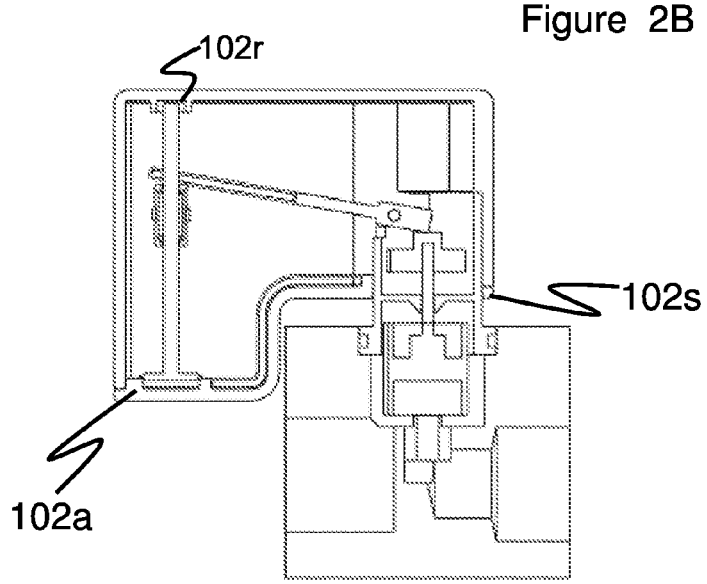

FIG. 2A-B are cross sectional views of an optional embodiment of a non limiting retrofit valve 101, as described in FIG. 1C, comprising valve body 10 that may be fit with a piezoelectric control module 100 according to an optional embodiment of the present invention. Optionally valve body 10 may be of any OTC valve or valve type for example including but not limited to solenoid valve or electromagnetic valve where the original valve control module is replaced with control module 100 according to an optional embodiment of the present invention. FIG. 2A shows the closed configuration of valve 101 while FIG. 2B shows the open configuration.

OTC valve body 10 comprising housing 12, valve inlet conduit/reservoir 10i and valve outlet reservoir 10o, most preferably flow through housing 12 from valve inlet 10i and outlet 10o is mediated by a valve seat 14 that may be gated (open and/or closed) optionally and preferably via a OTC gating module 16. Optionally and most preferably OTC gating module 16 comprises a valve stem 16t and valve seal member 16s. Most preferably valve seal member 16s corresponds to and securely fits with and/or over valve seat 14 therein providing gating control of valve 10 relative to the seal 16s.

Most preferably retrofit valve 101 is most preferably controlled with a piezoelectric control module 100 comprising housing 102, torque lever 106 and piezoelectric actuator 104 with electronic circuitry (not shown) provided to control gating module 16.

Most preferably housing 102 comprises at least one surface, for example 102s as shown, adapted for associating with at least a portion of OTC valve body 10, most preferably to provide access to valve gating module 16.

Most preferably torque lever 106 comprises a first end 106a and a second end 106b, for mediating between OTC valve gating module 16 and control module 100.

Most preferably piezoelectric linear actuator 104 comprises a piezoelectric or electrostrictive substrate 104e, with an electrode provided on each of both surfaces (not shown) of the piezoelectric or electrostrictive substrate 104e; an elastic body 104b, to one surface or each of both surfaces of which the piezoelectric or electrostrictive substrate 104e is attached; a movable shaft 104s coupled at an end thereof to the elastic body 104b or the piezoelectric or electrostrictive substrate 104e attached to the elastic body 104b, the movable shaft 104s may be operated in conjunction with displacement of the piezoelectric or electrostrictive substrate 104e; and a movable body 104L to be moved along the movable shaft.

Optionally movable shaft 104s may be further coupled or otherwise associated with housing 102 at the free end 104f of shaft 104s. Optionally housing 102 may comprise a recess 102r for accepting and/or receiving and/or fitting with free end 104f.

Most preferably piezoelectric linear actuator 104 is securely associated with housing 102 about said elastic body 104b. Optionally housing 102 comprises a recess 102a for accepting and/or receiving and/or fitting with elastic body 104b.

Most preferably torque lever 106 is coupled or otherwise associated with piezoelectric linear actuator 104 at torque lever first end 106a and moveable shaft 104s; while second end of torque lever 106b is most preferably coupled or otherwise associated, optionally and preferably in the form of a pivot, with valve gating module 16 therein most preferably forming a pivot point between torque lever 106 with valve stem 16t at torque lever second end 106b.

This coupling configuration provides for controlling gating module 16 to open and close valve 10 by maneuvering valve seal 16s relative to valve seat 14 via valve stem 16t by moving valve stem 16t up or down about torque lever 106 at its second end 106b. Movement of torque lever 106 at its second end 106b is provided by moving torque lever 106 at its first end 106a along the length of actuator shaft 104s via moveable load 104L. Most preferably movable load 104L disposed along the length of actuator shaft 104s by a control signal (108s) provided to actuator substrates 104e, the direction of motion depending on the power profile provided to actuator substrate 104e to move load 104L up or down shaft 104s. Most preferably the direction of movement of load 104L determines the state of gating module 16 for example including open, closed, partially open, or proportionally open or relative open percentage from about 0% (fully closed) to about 100% (fully open).

Most preferably the power profile provided to actuator substrate 104e is provided by a control signal (108s) from electronic circuitry (108) for controlling the power profile provided to electrodes (not shown) therein controlling the movement of load 104L and therein valve gating module 16 via torque lever 106.

Optionally the first end 106a of torque lever 106 may be integrated with load 104L, and therein provided as a single unit.

Optionally gating module 16 may be a dedicated gating module 16 that comes as part of control module 100, wherein optionally torque lever 106 second end 106b is integrated with valve stem 16s, therein provided as a single unit.

Optionally torque lever 106 may be directly or indirectly associated with said moveable shaft 104s.

Optionally piezoelectric linear actuator 104 may be remotely controlled via wireless electronics.

Optionally the piezoelectric linear actuator 104 may be controlled directly via dedicated electronic circuitry (108) via control signal (108s) or indirectly via a control signal (112s) provided from an auxiliary device (120) for example including but not limited to electronic devices as part of a manufacturing line, devices associated the functioning of valve 101 as part of a system.

Figure 3A:
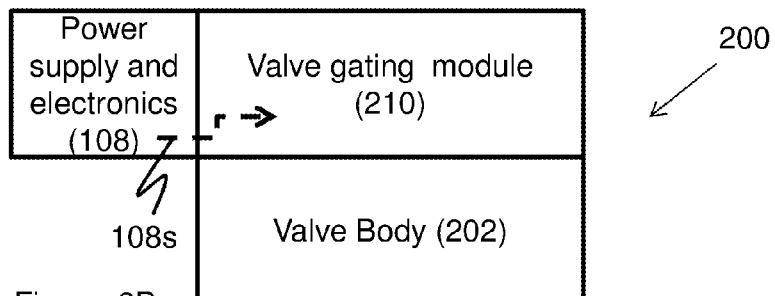
FIGS. 3A-C are schematic block diagrams of exemplary piezoelectric valves according to an optional embodiment of the present invention.
Figure 3B:
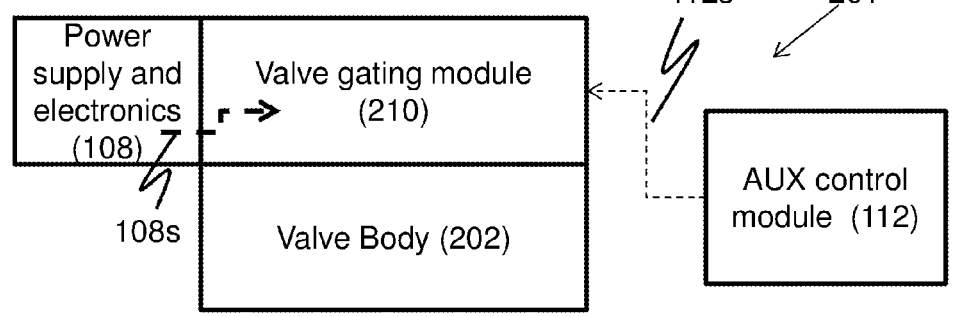
Figure 3C:
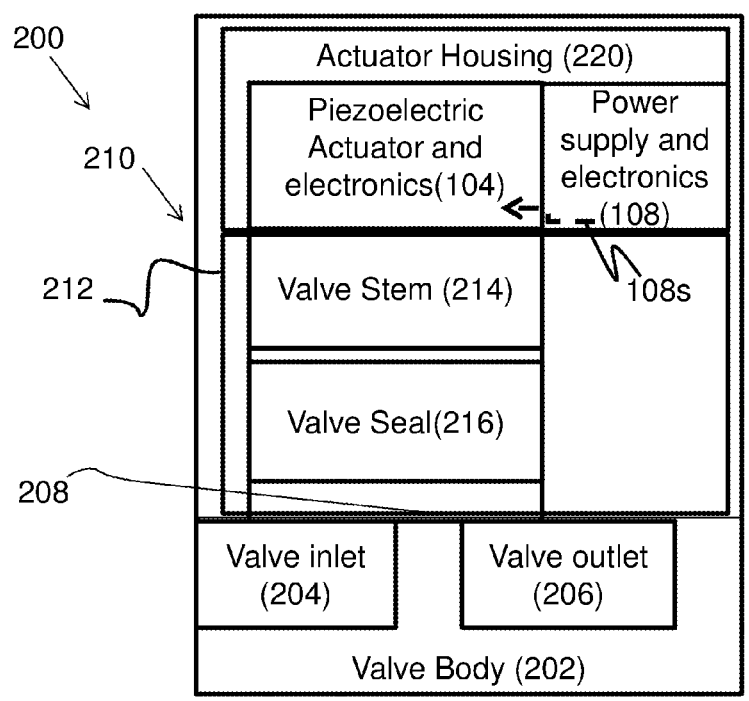

FIGS. 3A-C are schematic block diagrams of an exemplary piezoelectric valve apparatus 200 comprising a valve gating module 210 for controlling the flow of a flowing fluid through valve body 202. Most preferably gating module 210 comprises an internal power supply and electronic circuitry module 108 most preferably for providing a control signal (108s) for at least one or more piezoelectric actuators 104.

Optionally and preferably piezoelectric valve apparatus 200 comprises at least one or more piezoelectric actuators 104, more preferably at least two or more piezoelectric actuators 104, and most preferably at least four or more piezoelectric actuators 104. Most preferably piezoelectric actuators 104 provide to control fluid flow through the valve body 202 by associating actuators 104 with valve gating module to controllably open or close valve body 202.

FIG. 3B shows an optional configuration of piezoelectric valve apparatus 200 of FIG. 3A, shown in the form of an optional dual control valve system 201. Valve system 201 comprising an auxiliary valve control module 112 provided for remotely controlling and/or communicating with valve gating module 210 via valve internal control module 108.

Optionally, external and/or auxiliary controller 112 may be utilized in conjunction with an internal controller 108 to drive and control the piezoelectric valve 100 according to the present invention. For example, a remote valve control signal 112s may be generated by a user with an auxiliary controller module 112 and communicated to an internal controller 108 to control the piezoelectric valve 100, to control the flow through valve housing 10 by adjusting the position of piezoelectric actuator 104 relative to valve seat 14 most preferably in a linearly proportional manner relative to the communicated control signal 112s.

Optionally remote and/or auxiliary controller module 112 may be provided in optional forms for example including but not limited to a computer, mobile communication device, PDA, mobile telephone, robot, server, dedicated device, remote control, any combination thereof or the like device comprise processing, communication and power source capabilities. Optionally auxiliary controller module 112 may further comprise a display.

Optionally controller module 112 may communicate a control signal to gating module 210 using at least one or more communication protocols and/or technology for example including but not limited to wireless, radio frequency (RF), infrared (IR), optical, wired, near field communication (NFC), far field communication (FFC), RFID technology, acoustic, or any combination thereof.

Optionally remote and/or auxiliary controller module 112 may communicate with an internal controller module 108 or the like electronic circuitry for generating and communication a control signal (108s) to at least one or more, or a group of piezoelectric actuator 104.

Optionally remote and/or auxiliary controller module 112 may be controlled manually by a user. Optionally and more preferably remote and/or auxiliary controller module 112 may be controlled automatically according to at least one or more triggering event, for example including but not limited to a trigger, an occurrence, an event, an alarm, a scheduled event, an unscheduled event, threshold crossing, any combination thereof or the like triggering event.

Optionally valve gating module 210 may further provide for converting the linear movement to rotational motion, optionally and preferably to provide the appropriate circular motion for example as in a ball valve. Optionally appropriate conversion of linear motion to rotational motion may for example include but is not limited to gear, gear works, cam, transformer, piston, the like or any combination thereof.

Optionally gating control module 210 may be utilized with a fluid pump system (not shown) to facilitate fluid pumping rather than fluid flow control through a valve body 202.

FIG. 3C provides a schematic block diagram of valve 200 showing a more detailed schematic block diagram depiction of valve gating module 210. Most preferably gating module 210 comprises a gating module housing 212 comprising actuator housing 220. Most preferably, actuator housing 220 optionally and preferably comprises at least one and more preferably a plurality of piezoelectric actuator 104 with corresponding electronic controls 108. Most preferably gating module housing 212 comprises a valve stem 214 and a valve seal 216 for controlling the flow through valve body over valve seat 208 between valve inlet 204 and valve outlet 206. Most preferably the controlled activity of piezoelectric actuators 104 in module 210 controls the valve stem 214 about valve seat 208 therein controlling the valve state open/intermediate/closed and flow rate through valve body 202 from inlet 204 to outlet 206.

Figure 4A:
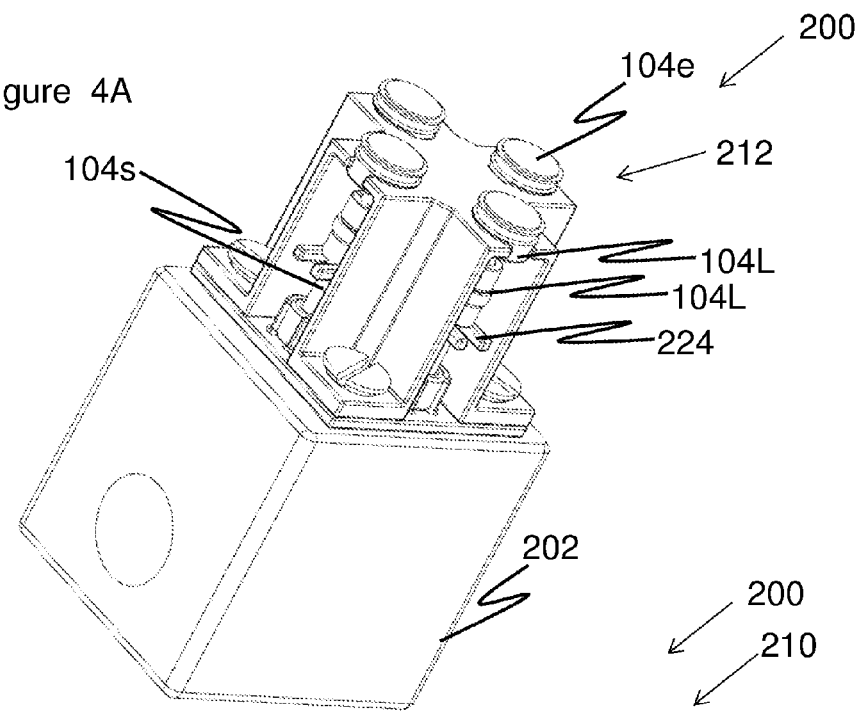
FIGS. 4A-C are cross sectional views of a piezoelectric valve according to an optional embodiment of the present invention according to the present invention.
Figure 4B:
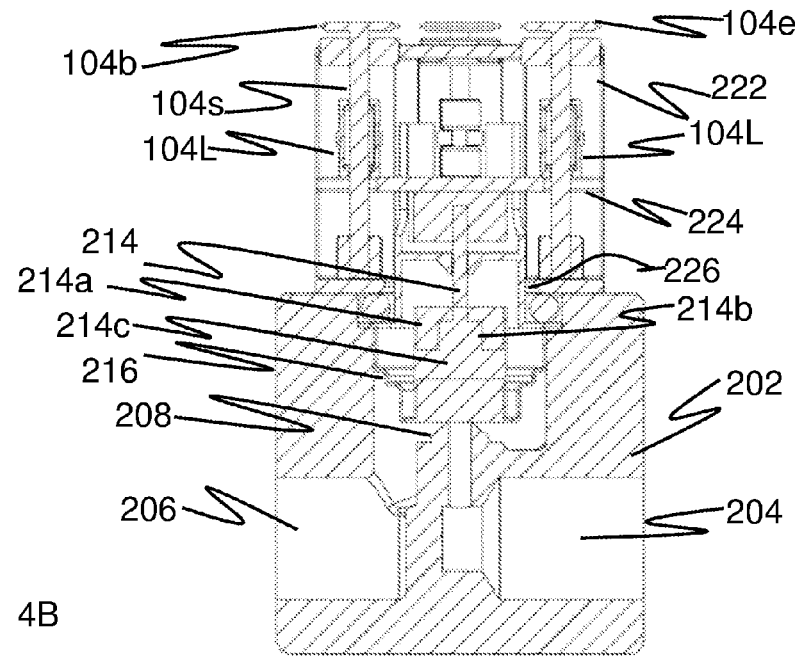
Figure 4C:
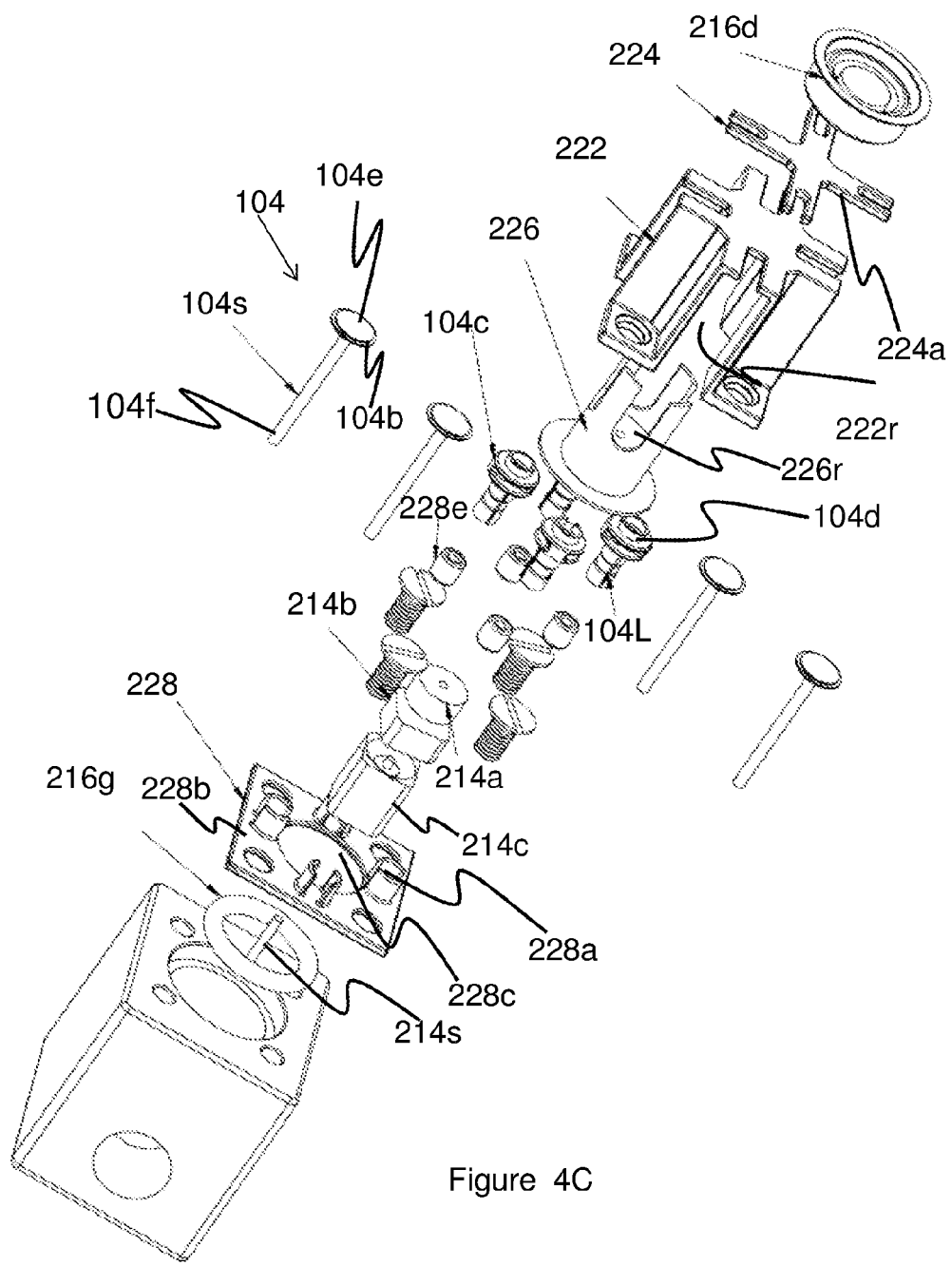

FIGS. 4A-C provide a schematic illustrations of varying view of valve 200 according to an optional embodiment of the present invention, FIG. 4A provides a perspective view of valve 200 showing valve actuator housing 220 with a plurality of piezoelectric actuators 104, shown in a four actuator 104 configuration, according to an optional embodiment of the present invention.

FIG. 4B shows a cross-section of valve 200 providing a detail look at the different components of valve 200 that provide for a linearly controllable valve that most preferably does not exhibit hysteresis effect, overheating, or the like drawbacks of the prior art while maintaining a high holding force of up to at least about 1 Kg, optionally and preferably without the use of a return spring.

FIG. 4C shows an exploded view of valve 200, further revealing the various components of an optional embodiment of the present invention for a linear piezoelectric valve.

Figure 5A:
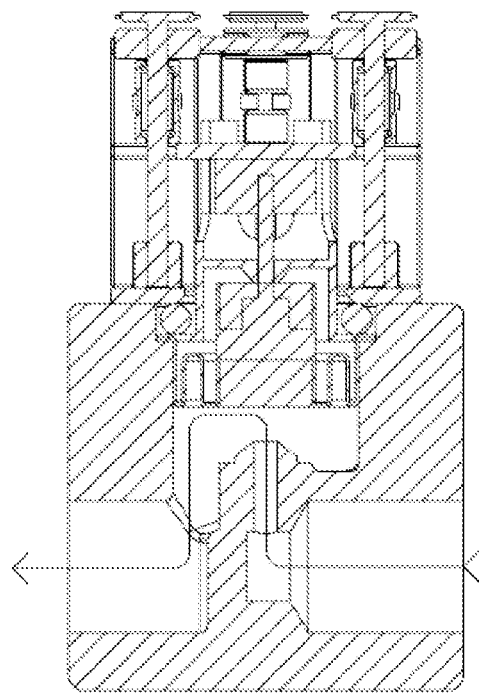
FIGS. 5A-C are cross sectional views of a piezoelectric valve according to an optional embodiment of the present invention according to the present invention showing the valve in different states, FIG. 5A showing the fully open configuration, FIG. 5B showing the partially open configuration, and FIG. 5C showing the closed configuration.
Figure 5B:
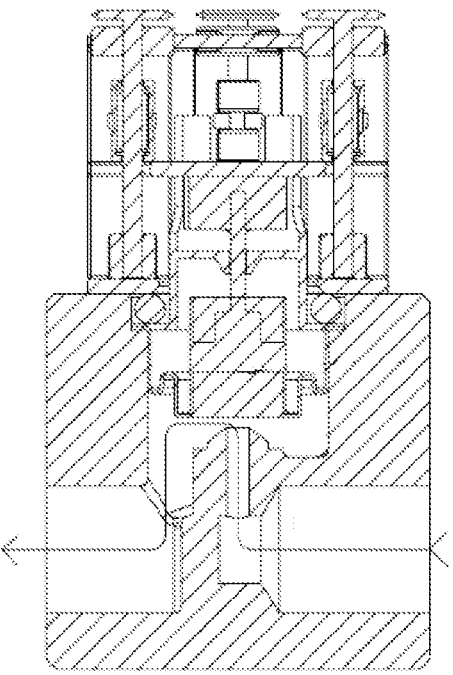
Figure 5C:
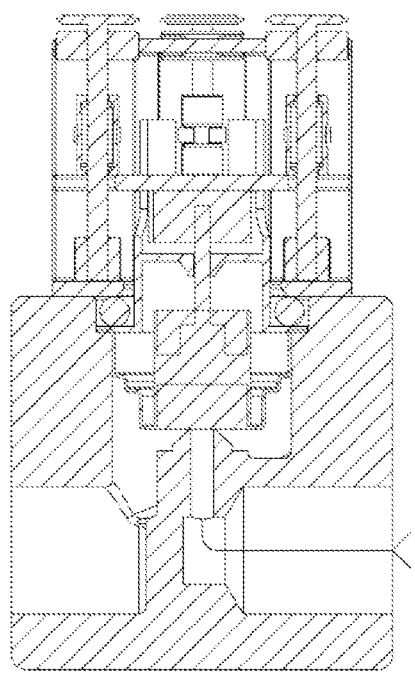

The following description collectively refers to FIGS. 4A-C. Most preferably, valve body 202 includes a valve inlet reservoir 204 and valve outlet valve body 202 mediated by a valve seat 208 that may be gated (open and/or closed) optionally and preferably with gating module 210, for example as shown in flow diagrams FIGS. 5A-C depicting the different valve configurations.

Most preferably valve seal member 216 corresponds to and securely fits with and/or over valve seat 208 therein providing gating control of valve 200 relative to movement of gating module 210 controlled with at least one or more preferably with plurality of piezoelectric actuators 104, as shown with four piezoelectric actuators 104.

Optionally and preferably gating module 210 includes at least one and more preferably a plurality and most preferably at least four or more piezoelectric actuator 104 provided in the form of a linear actuator that may be securely coupled and/or otherwise associated with actuator housing 220, disposed within gating module housing 212.

Most preferably a plurality of piezoelectric actuators 104 are provided in the form of individual linear actuator comprising a piezoelectric or electrostrictive substrate 104e, with an electrode provided on each of both surfaces (not shown) of the piezoelectric or electrostrictive substrate 104e; an elastic body 104b, coupled to one surface or each of both surfaces of which the piezoelectric or electrostrictive substrate 104e is attached; a movable shaft 104s coupled at an end thereof to the elastic body 104b or the piezoelectric or electrostrictive substrate 104e attached to the elastic body 104b, the movable shaft 104s may be operated in conjunction with displacement of the piezoelectric or electrostrictive substrate 104e; and a movable body 104L to be moved along the movable shaft.

Most preferably piezoelectric linear actuator 104 is securely associated with one another in a single housing, for example as shown housing 220 provided for associating up to four piezoelectric actuators 104. Most preferably, associated a plurality of actuators 104 provides for converging and/or combining the holding force available with each of the piezoelectric actuators, therein most preferably provided to concertedly act to control valve body 202 by uniformly controlling the position of a common valve stem 214 and valve seal 216 about valve seat 208.

Optionally a control signal (108s) may be provided to individually or uniformly control the activity of all linear actuators 104 utilized and or associated within housing 220. Optionally control of actuator 104 via module 210 may be provided about individual actuators, a group of actuators or all actuators within module 210. Optionally, as shown and described with respect to FIG. 3A-B a control signal (108s, 112s) may be generated by an internal and/or intrinsic control module and/or circuitry 108, or optionally by an external and/or auxiliary control module 112.

Actuator housing 220 preferably comprises, external actuator housing 222, actuator cross-link member 224, internal actuator housing 226, lower actuator housing member 228, actuator free end elastic member 228e, and actuator free end recess 228r. Most preferably external actuator housing 222 provides a main body for receiving a plurality of piezoelectric actuators 104. For example, an optional embodiment provides for an external housing 222 adapted for associating up to four actuators 104, as shown. Housing 222 comprises a recess 222r for receiving individual actuators 104 while disposing a plurality of actuators to be a 90 degree angle from an adjacent actuator, therein providing external housing 222 with a x-y plane and/or cross configuration, for example as shown.

Most preferably housing 222 is configured to have an open inner space (lumen), optionally and preferably for receiving accepting a plurality of actuators that may be further associated with one another via at least one or more coupling members for example including but not limited to cross link member 224, a plate, internal housing 226, most preferably provided for associating and/or coupling a plurality of actuators 104 such that they act to facilitate simultaneous and/or coordinated and/or concerted movement of a plurality of actuators, for example to provide for exerting a collective force about valve seat 208.

Optionally coupling members (224, 226) provide for coupling at least two or more piezoelectric actuators 104. Optionally coupling members may provide for coupling all actuators 104. Optionally and preferably coupling members may provide for coupling a portion and/or group of actuators. 104

Optionally plate and/or actuator cross-link member 224 provides for associating and/or coupling a plurality of actuators 104 such that they act simultaneously and/or in a coordinated and/or concerted manner most preferably with collective force. Most preferably cross-link member 224 provides for coupling all actuators 104.

Most preferably lumen of external housing 222 is further configured to receive and/or accept and/or house internal housing member 226. Internal housing is optionally and preferably provided for associating and/or mediating with cross-link member 224 providing a recess 226r for receiving cross-link member extensions and/or arms 224a that may further allow member 224 to be displaced about the height of internal housing member 226 for example as defined by recess 226r.

Most preferably internal housing member 226 provides to couple and/or associated a plurality of actuator 104 via cross-link member 224 to valve gating module housing 212 comprising valve stem 214 and valve seal 216 relative to valve body 202 most preferably about seat 208.

Most preferably valve seal 216 and valve stem function concertedly to bring about a seal relative to valve seat 208. Most preferably in order to maintain and provide a tight seal about seat 208 valve seal 206 comprises valve seal diaphragm 216d, and valve seal gasket 216g. Optionally and preferably diaphragm 216d may be customized to fit with a valve seat 208.

Optionally and preferably valve stem 214 comprises a valve stem upper member 214a, valve stem middle member 214b, valve stem lower member 214c and valve stem shaft/plunger 214s.

Optionally and most preferably valve stem upper member 214a facilitates coupling and/or otherwise associated with internal housing 226, while valve stem lower member 214c facilitates coupling and/or otherwise associating with seal 216 via diaphragm 216d.

Most preferably valve stem shaft and/or plunger 214s provides a centralized member for coupling and/or otherwise associating internal housing 226 with stem 214. Most preferably, stem shaft/plunger 214s therein provides for coupling the movements of valve stem 214 with that of at least one and more preferably a plurality of actuators 104 via internal housing 226.

Most preferably valve actuator housing 220 further comprises an end plate and/or lower actuator housing member/end plate 228, preferably provided for closing housing 220 and for coupling valve actuator housing with valve body 202.

Most preferably end plate 228 is provided with an actuator recess 228a for receiving and securing the distal end 104f of actuator 104. Most preferably distal end 104f is secured and/or coupled or otherwise associated onto end plate 228 via actuator recess 228a and actuator free end elastic member 228e. Most preferably actuator recess 228a is configured to receive fit with elastic member 228e which in turn is configured to received and fit actuator free end 104f.

Most preferably end plate 228 is provided with a central recess 228c provided for allowing valve gating module 212 to freely pass therethrough from the actuator housing 220 to the valve seat 208 disposed in valve body 202.

Optionally and preferably end plate 228 is provided with at least one and more preferably a plurality of coupling recess 228b, provided for coupling actuator housing 220 to valve body 202. For example coupling recess 228b provides for coupling valve body 202 to actuator housing 220 with a plurality of fasteners for example provided in the form of nuts, and bolts and/or screws or the like means for fastening and or securing valve body 202 to actuator body 220, for example as shown.

FIGS. 5A-C provide schematic illustrations of the different states of valve 200,201 based on the flow through valve body 202. FIG. 5A shows valve 200,201 in the fully open configuration where the valve seat 208 is fully open allowing for maximal flow through valve body 202, as depicted by flow arrow shown. FIG. 5B shows the partial open configuration where valve seat 208 is partially closed allowing a proportional flow through valve body 202. Lastly, FIG. 5C shows valve 200,201 in the fully closed position not allowing a flowing fluid to flow through valve body 202. The closed position shown in FIG. 5C shows valve seat 208 is fully engaged with valve seal 216 utilizing plunger 214.

Figure 6A:
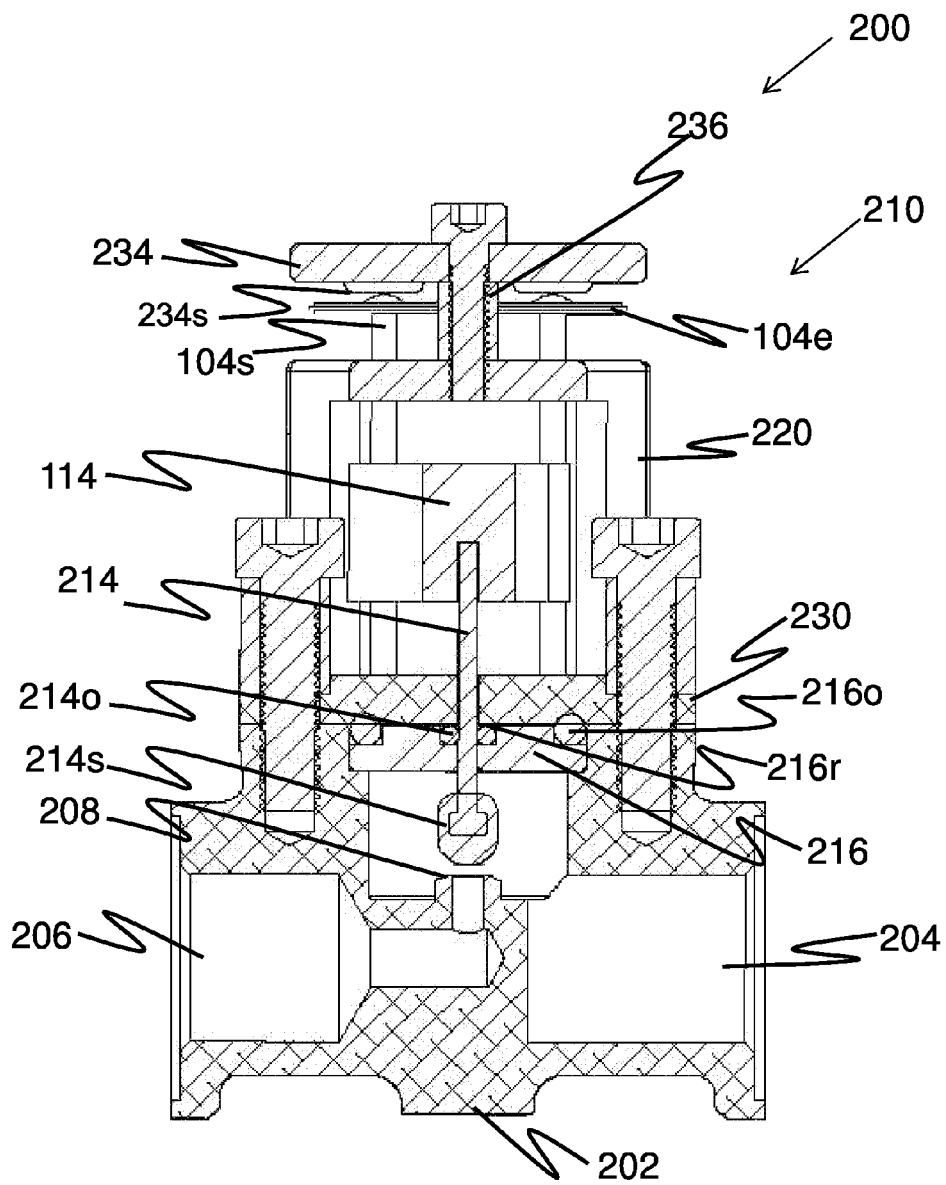
FIGS. 6A-B are various views of a piezoelectric valve according to an optional embodiment of the present invention.
Figure 6B:
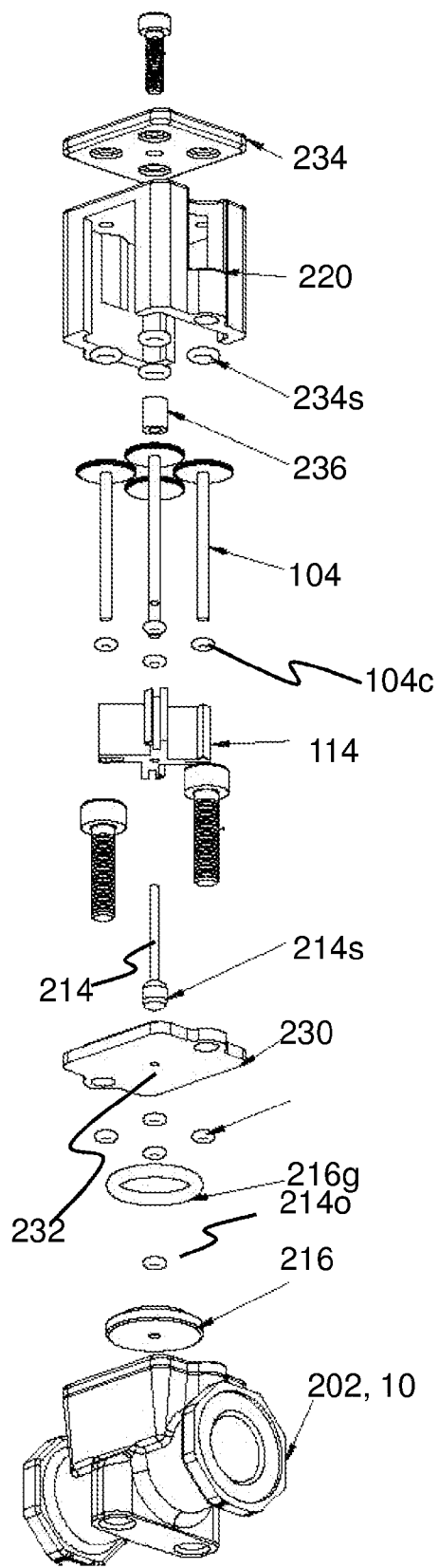

FIGS. 6A-B show a further optional embodiment of the present invention for a proportional linear valve controlled with a piezoelectric linear actuator, as previously described. Most preferably a valve body 202 is coupled or otherwise associated directly or indirectly with at least one or more piezoelectric linear actuators 104, and more preferably four piezoelectric linear actuators 104, as shown. The plurality of linear actuators 104 provide a piezoelectric valve apparatus are housed within a valve gating housing 212 for controlling the flow of a fluid through a valve body 202, by controlling with valve stem 214 that interfaces both valve gating housing 212 and valve body 202 most preferably over a valve seat 208, as previously described.

The optional valve assembly 200 depicted in FIG. 6A-B is characterized in that the valve gating module 210 controls the valve stem 214 over valve seat 208 with a cross-linked load 114 that is common to and links (cross-links) a plurality of piezoelectric valves 104 about their shafts 104s utilized in gating module 210, as shown in FIGS. 7A-B. FIGS. 7A-B, show cross linked-load 114 that provides for linking four piezoelectric actuators 104 to control valve stem 214 relative to valve seat 208 to provide fluid flow control through valve housing 202.

Optionally and preferably actuator cross-link load 114 provides for associating and/or coupling at least two or more, or a group of or a plurality of actuators 104 such that they act simultaneously and/or in a coordinated and/or concerted manner most preferably with collective force or thrust. Most preferably cross-link member 114 provides for coupling all actuators 104.

FIG. 6A shows a cross sectional view of an optional valve assembly 200 having a valve gating module 210, similar to that described in FIGS. 3-4, however characterized in that it comprises cross linking load 114 for facilitating gating control over valve seat 208 with valve stem 214.

As previously described valve body 202 may optionally be in the form of an OTC valve body 10, while valve gating module 210 may be customized to fit and couple with the OTC valve body 10, in particular valve stem 214 and in particular valve stem seal/plunger 214s may be specific to fit over valve seat 208 of OTC valve 200.

Optionally valve stem 214 may be customized about any of its parts. Optionally valve stem seal/plunger member 214s, for example as illustrated in FIGS. 6A-B, may be customized and/or configured and/or shaped to fit over a valve seat 208 so as to minimize fluid flow resistance through seat 208. Optionally and preferably stem plunger/seal 214s may be shaped so as to optimize the flow resistance (minimize) through seat 208 and (maximize) thrust of plunger 214 provided by gating module 210, therein most preferably providing a balance between the forces acting across valve seat 208.

Optionally end plate member 230 defining the coupling and division point between valve body 202 and valve gating housing 212 may be further customized so as to fit with and couple between housing 212 and an OTC valve body 202.

FIG. 6A shows a cross-section of a further optional valve 200 providing a detailed look at the different components of valve 200 that provide for a linearly controllable valve that most preferably does not exhibit hysteresis effect, overheating, or the like drawbacks of the prior art valves while maintaining a high holding force of up to at least about 1 Kg.

FIG. 6B shows an exploded view of valve 200 depicted in FIG. 6A, comprises valve body 202 and valve gating module 210 disposed within an gating module housing 212, revealing the various components therein, in particular cross-linked load 114 disposed within gating module 210.

As previously described, valve body 202 may include a valve inlet reservoir 204 and valve outlet valve body 202 mediated by a valve seat 208 that may be gated (open and/or closed) optionally and preferably with gating module 210, for example as shown in FIGS. 5A-C depicting different valve configurations. Optionally valve body 202 may be an OTC valve body in a plurality of various forms and configurations for example including but not limited to a leaf valve, T-valve, 4 way valve, 3 way valve, multi-way valve, or any valve body provided for gating fluid control therethrough.

Most preferably valve body 202 houses a valve seal member/plate 216 provides to seal valve body 202 therein most preferably preventing fluid leakage and/or flow outside of valve body 202 and in particular toward valve gating housing 212. Seal 216 may comprise an o-ring 216o about its circumference to increase the seal about the edges of seal 216.

Seal plate 216 most preferably comprises a central bore or recess 216r for receiving and allowing valve stem 214 therethrough. Seal plate recess 216r is most preferably fit with a plunger o-ring 214o to further ensures seal through plunger recess 216r.

Valve body 202 and gating housing 212 housing gating module 210 are optionally and preferably separated with end plate member 230 having a recess 232 provided for receiving and/or housing valve stem 214 there-through allowing stem 214 to interface both valve body 202 and housing 212.

Optionally and preferably gating module 210 includes at least one, more preferably a plurality of piezoelectric actuator 104. More preferably at least four or more piezoelectric actuator 104, provided in the form of a linear actuators, that may be securely coupled and/or otherwise associated with actuator housing 220, disposed within gating module housing 212.

Optionally gating module housing 212 may be customized to fit with an OTC valve body 10, for example valve body 202 or the like. Optionally housing 212 comprises at least two end plates comprising a first (lower) end plate 230 and a second (upper) end plate 234. As previously described first end plate 230 may be customized to separate valve body 202 from housing 212. Optionally and preferably end plate 234 defines a cover and or top for housing 212, for example as shown. Optionally and preferably end plate 234 may further comprise an associate with a spacer 236 provided for accounting for the length of and actuator 104 so as to properly fit in housing 212. Optionally end plate 234 may be further associated with a sealing member 234s.

Housing 212 preferably provides for housing at least one or more linear actuator 104 with actuator housing 220. Optionally the external surface of housing 212 may serve as actuator housing 220, for example as shown in FIG. 6B. Most preferably actuator housing 220 provides for holding and/or receiving at least a portion of, at least one or more preferably a plurality of actuators 104. Optionally actuator housing 220 may comprise a plurality of member for example as shown and described with respect to FIGS. 4A-C.

As previously described, most preferably a plurality of piezoelectric actuators 104 are provided in the form of individual linear piezoelectric actuators comprising a piezoelectric or electrostrictive substrate 104e, with an electrode provided on each of both surfaces (not shown) of the piezoelectric or electrostrictive substrate 104e; an elastic body 104b, coupled to one surface or each of both surfaces of which the piezoelectric or electrostrictive substrate 104e is attached; a movable shaft 104s coupled at an end thereof to the elastic body 104b or the piezoelectric or electrostrictive substrate 104e attached to the elastic body 104b, the movable shaft 104s may be operated in conjunction with displacement of the piezoelectric or electrostrictive substrate 104e; and a movable body 104L to be moved along the movable shaft.

Optionally movable body 104L may be a single load associated with a single actuator 104, for example as depicted in FIG. 1-4. Optionally moveable body 104L may be provided as a load common to at least two or more or a group of individual actuators 104, such that the moveable body 104L associates and/or couples at least two or more actuator shafts 104s. For example a moveable body that is common to a plurality of individual actuators 104 about their shafts 104s, is depicted in FIGS. 6-7 in the form of cross-linked load 114, that provides for coupling or otherwise associating four actuators 104.

Optionally the association of actuators 104 about housing 220 about at least a portion of actuators 104, and/or by utilizing cross-liked load 114 (FIG. 7A-B) may provide for converging and/or combining and/or integrating the holding force available from each of the piezoelectric actuators, that in turn optionally and preferably facilitate the concerted activity of actuators 104 to control fluid flow through valve body 202 by optionally, uniformly controlling the position of valve stem 214 about valve seat 208.

As previously described, optionally and preferably a control signal (108s, 112s) may be provided to control the activity linear actuators 104 utilized and or associated within housing 212. Optionally control of actuator 104 via module 210 may be provided about individual actuators, a group of actuators or all actuators within module 210. Optionally, as shown and described with respect to FIG. 3A-B, a control signal (108s, 112s) may be generated by an internal and/or intrinsic control module and/or circuitry 108, or optionally by an external and/or auxiliary control module 112.

Most preferably valve seal 216 and valve stem 214 function concertedly to bring about a seal relative to valve seat 208. Optionally and preferably in order to maintain and provide a tight seal about seat 208 stem plunger 214s is shaped to properly fit about seat 208. For example as shown in FIG. 6A-B plunger 214s has a minimal profile to fit with over seat 208.

Optionally valve stem 214 may be associated with cross linked load 114 via a central bore and/or recess 114r to provide for coupling and/or otherwise associating stem 214 with gating module 210. Most preferably, when coupled, the movement of cross-linked load 114 controls the movement of valve stem 214 and plunger 214s relative to seat 208. The movement of load 114 is controlled with at least one or more piezoelectric actuators 104, about shafts 104s. Therein the movement of valve stem 214 about seat 208 is indirectly controlled by the movements provided by at least one or more actuators 104. For example, when load 114 is raised about shaft 104s, that in turn raises valve stem 214 over seat 208, therein open seat 208 allowing fluid flow through valve body 202, for example from inlet 204 to outlet 206. Most preferably the degree with which valve stem 214 is raised ('opened') about valve seat 208 determined the flow rate through valve body 202. Accordingly predictable, controllable and linear control of fluid flow through valve body 202 is provided as direct and linear control of valve stem 214 is provided by at least one and more preferably a plurality of piezoelectric actuators 104, via cross-linked load 114. Most preferably the valve assembly provides a holding force of up to 1 Kg.

FIGS. 7A-B show different views of cross-linked load 114. FIG. 7A shows a perspective view of a cross linked load 114 that provides for associating a single valve stem 214 about central recess 114r and up to four actuators 104 about shaft 104s through actuator shaft recess 114a.

FIG. 7A shows linked load 114 as a single member piece coupling up to four actuators 104. Cross-linked load 114 is shown in a particular "plus", "+" shape configuration and geometry, specifically described in FIG. 7B, according to an optional embodiment of the present invention. Optionally and preferably, cross-linked load 114 comprises a central body 114c forming the core of load 114 with a plurality of extending arms 114e. Most preferably the number of extending arms 114e may be provided in relation to the number of actuators 104 utilized, for example as shown four arms corresponding to a four actuators 104 valve gating module 210. Most preferably core 114c comprises a bore and/or recess 114r for coupling with at least one valve stem 214. Most preferably arms 114e extend from core 114c, defining a proximal end 114p, adjacent to core 114c, and a distal end 114d. Most preferably distal end 114d comprises a recess 114a for accepting and/or holding or otherwise associating with at least one or more actuator 104 about at least a portion of actuator shaft 104s.

Optionally and preferably load 114 is provided from a single continuous, fluid material for example including but not limited to polymers, plastics, alloys, metals, metal alloys, any combination thereof or the like. Optionally load 114 may be configured from a plurality of member pieces that correspond to or otherwise couple or connect with one another. For example core 114c may provide a first member piece, while at least one or more extending arms may be provided from a second member piece that correspond or otherwise associate with core 114c.

Optionally cross-linked load 114 may be configured from at least two or more member pieces, to cross-link any number of actuators, for example a group of two, three, or more actuators. For example, cross-linked load 114 may be configured from two member piece therein linking, two adjacent actuators and/or two opposite actuators 104.

Optionally the cross linked-load member 114 may be provided in any optional geometric shape and/or configuration in order to meet valve requirements according to at least one or more parameters, for example including but not limited to type of valve, valve shape, valve body, number of actuators, type of actuators, actuator thrust, holding force requirements, number of valve stems, type of valve stem, direction of flow, number of direction flows, location of actuator shaft placement (recess 104a), any combination thereof or the like.

Optionally cross-linked load may be configured to control at least one or a plurality of valve stems. For example a cross linked load may be configured to couple with a plurality of valve stem 214 or a split valve stem (not shown), such that at least one or more valve stem may be utilized to control a direction of flow through a valve body. For example a 3-way valve body may be controlled with a plurality of valve stems wherein each valve stem may control a single direction of flow through the 3-way valve body.

FIG. 7B provides a partial close up view of linked load 114 particularly showing extending arms 114e depicting an optional embodiment of the present invention. Extending arm 114e extends from and is fluid with load core 114c, defining a proximal end 114p and a distal end 114d. Arm 114e is characterized by having two substantially parallel extensions including, a base member 114b and a shaft support member 114s, separated by a recess 114a.

Optionally and preferably the geometry of recess 114a may be configured according to the dimension of actuator shaft 104s, for example shaft diameter or length, so as to optimize valve requirements in particular the holding force, and thrust provided by gating module 210. Most preferably at least one dimension of recess 114a, for example width marked 'Y', is configurable according to actuator shaft 104s and valve requirements.

Most preferably base member 114b, as shown, is provided with a substantially quadrilateral geometric configuration in the form of a rectangle having width dimension 'L'. Optionally and preferably the width of base member 114b may be configured according to the valve requirements. Optionally and preferably at least one surface of base member 114b or a portion thereof may be in contact with at least a portion of actuator shaft 104s, for example the luminal surface 114f, as shown. Optionally, in order to accommodate shaft 104s, the contact point between actuator shaft 104s and base member 114b about luminal surface 114f may be shaped and/or configured to according to the shape and/or configuration of shaft 104s to optimize the contact surface for example to provide further control for friction between shaft 104s and base 114b. For example the contact point about luminal surface 114f may be provided with a curvature for example to accommodate shaft 104s therein increasing the surface area in contact with base 114b and shaft 104s, for example providing for increased friction and/or resistance. Optionally, luminal surface 114f may be configured to minimize the contact point with shaft 104s and therein the surface area between them optionally leading to reduced friction and/or resistance between shaft 104s and luminal surface 114f.

Preferably shaft support member 114s is shaped and/or configured to receive actuator shaft 104s, for example as shown. Optionally and preferably shaft support member 114s comprises a dedicated portion for receiving and/or housing actuator shaft 104s, for example including a triangular shaft receiving portion 114t disposed bout the distal end of shaft support member 114s, as shown. Optionally receiving portion 114t may be disposed and/or placed anywhere along the length of shaft support member 114s, for example including but not limited to proximal portion, medial portion or distal portion (as shown). Optionally the shape of shaft receiving portion may be according to any geometric shape to define the number of contact points with actuator shaft 104s. For example, receiving portion 114t having a triangular configuration, as shown, comprises at least two contact points with actuator shaft 104s. Optionally receiving portion 114t may be provided with a quadrilateral configuration having at least three or more contact points with actuator shaft 104s. Optionally the shape and/or configuration of shaft receiving portion 114t may be configured to be any polygonal structure having 'n' sides (wherein n=3 or more) to define at least 'n−1' contact points with actuator shaft 104s.

Optionally and preferably the configuration of shaft receiving portion shaft support member 114s and/or receiving member 114t may be configurable about at least one or more parameters for example including but not limited to materials, material characteristics, material hardness, dimension, shape, thickness ('Z'), length, distance from core 114c, distance from proximal end 114p ('X'), shape, shaft contact points, shaft to receiving member 114t surface area, any combination thereof or the like. For example, as shown, the distance from the proximal end 114p to the center of receiving portion 114t may be configured according to distance marked 'X'. For example, the thickness of shaft support member 114s may be configured according to thickness marked 'Z', as shown.

Optionally and most preferably, receiving portion 114t comprises a luminal surface 114h, facing recess 114a, a portion of which may be in contact with at least a portion of actuator shaft 104s, for example within recess 114a, as shown. Optionally, in order to accommodate shaft 104s, the contact point between actuator shaft 104s and receiving portion 114t about luminal surface 114h may be shaped and/or configured according to the shape and/or configuration of shaft 104s so as to optimize the contact surface there-between according to at least one or more valve requirements for example including but not limited to actuator thrust and valve holding force. Optionally and preferably configuring the luminal surface 114h may provide further control of friction between shaft 104s and support member 114s specifically receiving portion 114t. For example, the contact points about luminal surface 114f may be provided with a curvature, for example to accommodate shaft 104s therein increasing the surface area in contact with portion 114t and shaft 104s, for example providing for increased friction and/or resistance. Optionally, luminal surface 114h may be configured to minimize the contact point with shaft 104s and therein the surface area between them optionally leading to reduced friction and/or resistance between shaft 104s and luminal surface 114h.

As previously described, cross linked-load member 114 may be configured in order to meet valve requirements according to at least one or more parameters, for example including but not limited to type of valve, valve shape, valve body, number of actuators, type of actuators, actuator thrust, holding force requirements, number of valve stems, type of valve stem, direction of flow, number of direction flows, location of actuator shaft placement (recess 104a), any combination thereof or the like. Optionally and preferably cross-linked member 114s may be optimized and/or configured about extending arms 114e so as to account for valve requirements at least in configuring actuator thrust and valve holding force based on arm 114e dimension for example including but not limited to 'X', 'Y', 'Z', as shown and previously described. For example, changing the length of 'X' by a given distance has direct effect on the holding force and thrust of valve actuating module 210, for example, reducing 'X' by 0.2 mm may increase the valve holding force by 150 g and thrust by 70 g.

While the invention has been described with respect to a limited number of embodiment, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not described to limit the invention to the exact construction and operation shown and described and accordingly, all suitable modifications and equivalents may be resorted to, falling within the scope of the invention.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention defined by the appended claims.

Further modifications of the invention will also occur to persons skilled in the art and all such are deemed to fall within the spirit and scope of the invention as defined by the appended claims.

While the invention has been described with respect to a limited number of embodiments, it will be appreciated that many variations, modifications and other applications of the invention may be made.

What is claimed is:

1. A piezoelectric valve control module (100, 210) for controlling the flow through a valve body (10,202) about a valve seat (14,208) by controlling the position of a valve stem (16t, 214) relative to said valve seat (14, 208), said control module including:
    a) a housing (212, 102) having at least one member or surface (228, 230, 102s) adapted for associating with at least a portion of said valve body (10, 202);
    b) said housing (212, 102) including at least one piezoelectric linear actuator (104) that is associated with a valve stem (214, 16t) to control the position of said valve stem relative to said valve seat;
    c) said piezoelectric linear actuator (104) comprising a piezoelectric or electrostrictive substrate (104e), with an electrode provided on each of both surfaces of the piezoelectric or electrostrictive substrate; an elastic body (104b), to one surface or each of both surfaces of which the piezoelectric or electrostrictive substrate (104e) is attached; a shaft (104s) coupled at an end thereof to the elastic body (104b) or the piezoelectric or electrostrictive substrate (104e) attached to the elastic body, the shaft (104s) being operated in conjunction with displacement of the piezoelectric or electrostrictive substrate (104e); and a moveable body (104L, 114, 226) to be moved along the movable shaft;
    d) wherein the movement of-said moveable body (104L, 114, 226) along the axis of said shaft (104s) is controlled with a control signal (108s) produced by electronic circuitry (108) disposed in said housing, for controlling the power profile provided to said piezoelectric linear actuator (104), therein controlling the position of a valve stem (16t, 214) associated with said moveable body (104L, 114, 226) and the flow rate through said valve body (10,202), characterized in that the flow rate though said valve body is configurable with said control signal (108s) such that said flow rate is proportional with said control signal (108s);
    e) wherein said moveable body (114) comprises:
        i) a central body (114c) comprising a recess (114r) for coupling with a valve stem (214);
        ii) at least one arm (114e) extending from said central body wherein said arm (114e) has a proximal end (114p) and a distal end (114d) wherein said proximal end extends from said central body and wherein said distal end (114d) associates with said actuator shaft (104s) about a recess (114a) for accepting said actuator shaft (104s); said arm (114e) is characterized by having two substantially parallel extensions including, a base member (114b) and a shaft support member (114s), separated by said recess (114a) defining two opposing luminal surfaces (114f, 114h), wherein recess (114a) has a configurable dimension ('Y'); said base member (114b) defining at least one actuator shaft contact point about said first luminal surface (114f) within said recess (114a); wherein said base member (114b) has a configurable dimension ('L'); and said shaft support member (114s) having a shaft receiving portion (114t) about said second luminal surface (114h) defining at least one or more actuator shaft contact points within said recess (114a); wherein said shaft support member (114s) has two configurable dimensions ('Z') and ('X'); and iii) wherein said arm (114e) is configurable about at least one or any combination of parameters selected from the group consisting of material characteristics, material hardness, dimension ('L') of base portion (114b), dimension ('Y') of said shaft receiving recess (114a), dimension ('Z') of said shaft support member (114s), dimension ('X') defining the location of said shaft receiving portion (114t).

2. The valve control module of claim 1 wherein the flow rate through said valve body is linearly proportional with said control signal (108s, 112s).

3. The valve control module of claim 1 comprising a processor for determining or configuring the correlation between said flow rate and said control signal.

4. The valve control module of claim 1 comprising a plurality of piezoelectric actuators.

5. The valve control module of claim 1 comprising at least four piezoelectric actuators (104).

6. The valve control module of claim 1 wherein said valve stem (16t, 214) is associated with said piezoelectric linear actuator (104) utilizing a mediating member.

7. The valve control module of claim 6 wherein said mediating member is a torque lever (106) comprising a first end (106a) and a second end (106b), wherein of said first end (106a) is coupled to said actuator about moveable shaft (104s) or load (104L), and wherein said torque lever second end (106b) is pivoted with said valve stem (16t).

8. The valve control module of claim 7 wherein said torque lever (106) is integrated with said moveable body.

9. The valve control module of claim 1 wherein said piezoelectric linear actuator is controlled remotely with an auxiliary valve control module (112) producing a control signal (108s, 112s).

10. The valve control module of claim 9 wherein said auxiliary control module (112) communicates a control signal (112s) using at least one or more communication protocols and/or technology selected from the group consisting of wireless, radio frequency (RF), infrared (IR), optical, wired, near field communication (NFC), far field communication (FFC), RFID technology, acoustic, or any combination thereof.

11. The valve control module of claim 1 wherein said valve body (10, 202) is an Over The Counter ('OTC') valve body and wherein said housing (212, 102) is configured to associate with said OTC valve body (10,202) about said at least one member or surface (228, 230, 102s).

12. The valve control module of claim 11 configured to be retrofit with an OTC valve body wherein said valve control module (210, 100) replaces the control module of an OTC valve.

13. The valve control module of claim 12 wherein said OTC valve is selected from the group consisting of solenoid controlled valves, on-off valves, non-discrete valves.

14. The valve control module of claim 11 wherein said at least one member or surface (228, 230, 102s) is provided to access the OTC valve body about at least one member selected from the group consisting of OTC valve seat (14), OTC valve stem (16t), OTC gating module (16), any combination thereof.

15. The valve control module of claim 11 wherein said control module further comprising an integrated valve stem that is coupled with a valve stem seal (214s) configured according to an OTC valve seat.

16. The valve control module of claim 15 wherein a valve stem plunger (214s) is provided with a minimal profile and shaped in accordance with said OTC valve seat.

17. The valve control module of claim 1 wherein the valve holding force about said valve stem is configured to be from about 100 grams force (gf) to about 2000 grams force (gf).

18. The valve control module of claim 1 wherein the valve holding force about said valve stem is configured to be up to about 2000 grams force (gf).

19. The valve control module of claim 1 wherein the valve holding force about said valve stem is configured to be up to about 1000 grams force (gf).

20. The valve control module of claim 1 wherein said moveable body (104L, 114, 226) is configured to couple a group of piezoelectric actuators (104) about their actuator shaft (104s).

21. The valve control module of claim 20 configured to control a valve body having a plurality of direction of flow.

22. The valve control module of claim 21 wherein each group of piezoelectric actuators controls a single direction of flow.

23. The valve control module of claim 1 wherein said moveable body (104L, 114, 226) is configured to couple all piezoelectric actuators (104) about their actuator shaft (104s).

24. The valve control module of claim 1 wherein said arm (114e) is configured according to the required valve holding force.

25. The valve control module of claim 1 wherein the shape of said shaft receiving portion (114t) is configured to be triangular therein defining at least two actuator shaft contact points.

26. The valve control module of claim 1 wherein the shape of said shaft receiving portion (114t) is configured to be polygonal having n sides, wherein n is at least 3, therein defining at least n-1 actuator shaft contact points, about said second luminal surface (114h).

27. The valve control module of claim 1 wherein at least one dimension of said recess (114a) or said arm (114e) is configured according to a dimension of said actuator shaft (104s).

28. The valve control module of claim 1 wherein said moveable body (114) is configurable according to at least one or more valve parameters selected from the group consisting of type of valve, valve shape, valve body, number of actuators, type of actuators, actuator thrust, holding force requirements, number of valve stems, type of valve stem, direction of flow, number of direction flows, location of actuator shaft placement (recess 104a), or any combination thereof.

29. The valve control module of claim 1 wherein said moveable body (114) is configurable according to at least one or more of valve requirements selected from actuator thrust and valve holding force.

30. The valve control module of claim 26 wherein the valve holding force and actuator thrust of said moveable body (114) is configured according to at least one or more selected from the group consisting of materials, material characteristics, material hardness, or any combination thereof.

31. The valve control module of claim 1 wherein said at least two luminal surfaces (114f, 114h) are shaped or configured according to the shape or configuration of said actuator shaft (104s) so as to optimize the contact surface there-between, according to at least one or more valve requirements selected from the group consisting of actuator thrust and valve holding force.

32. The valve control module of claim 1 wherein said valve body is selected from the group consisting of leaf valve, T-valve, 4 way valve, 3 way valve, multi-way valve, or any valve body provided for gating fluid control therethrough.

33. The valve control module of claim 1 wherein gating of said valve body is governed by rotational motion, said housing further comprises a linear motion to rotational motion converter wherein the linear motion of said actuator (104) is converted to rotational motion of a valve stem relative to a valve seat.

34. The valve control module of claim 33 wherein said valve body is selected from the group consisting of a ball type valve, torque valve, or a turn valve.

35. The valve control module of claim 33 wherein said converter comprises at least one or more selected from the group consisting of gear, gear works, cam, linear to rotational transformer, piston, or any combination thereof.

36. The valve control module of claim 1 further comprising an integrated valve stem coupled with said moveable body (104L, 114, 226) that is associated with said actuator (104) along said shaft (104s).

37. The valve control module of claim 36 wherein said integrated valve stem is coupled to at least one member of an OTC valve body, selected from the group consisting of OTC valve stem (16t), OTC gating module (16), any combination thereof.

38. A linearly proportional valve comprising the valve control module of claim 1 integrated with a valve body (202) such that said control module (210) controls a valve stem (214) and valve stem plunger (214s) about a valve seat (208).

39. The valve of claim 38 wherein said valve stem plunger (214s) is shaped in accordance with said valve seat (208).

\* \* \* \* \*